United States Patent [19]
Asano

[11] Patent Number: 5,881,657
[45] Date of Patent: Mar. 16, 1999

[54] DATA PROCESSING DEVICE FOR PATTERN SEWING SYSTEM

[75] Inventor: Fumiaki Asano, Nagoya, Japan

[73] Assignee: Brother Kogyo Kabushiki Kaisha, Aichi-ken, Japan

[21] Appl. No.: 46,156

[22] Filed: Mar. 23, 1998

[30] Foreign Application Priority Data

Mar. 24, 1997 [JP] Japan ................................ 9-070140

[51] Int. Cl.⁶ .................................................. D05B 19/00
[52] U.S. Cl. .............................. 112/102.5; 112/470.02; 112/470.04; 364/470.09
[58] Field of Search ................. 112/470.01, 470.02, 112/470.04, 470.06, 102.5, 470.05, 155; 364/470.09

[56] References Cited

U.S. PATENT DOCUMENTS 4,359,953  11/1982  Martell et al. ................ 112/470.04 X
5,050,513   9/1991  Frankel ......................... 112/470.04 X
5,752,458   5/1998  Morita .......................... 112/470.04 X

*Primary Examiner*—Peter Nerbun
*Attorney, Agent, or Firm*—Kane, Dalsimer, Sullivan, Kurucz, Levy, Eisele and Richard, LLP

[57] ABSTRACT

Disclosed is a data processing device for processing data representing an operation status of a pattern sewing system which includes at least one pattern sewing machine alternately operated by a plurality of operator groups. The data processing device may include a time zone setting device which sets a plurality of time zones. A plurality of operator groups operate the pattern sewing machine during a plurality of time zones, respectively. There is provided a log data recording device which records an operation status of the pattern sewing machine as log data, and an operation data creating device which creates operation data representing a predetermined operation parameter for each of a plurality of operator groups based on a plurality of time zones set by the time zone setting device and the log data recorded by the log data recording device.

20 Claims, 17 Drawing Sheets

FIG. 4

MACHINE: AAAAAA
DATE          TIME         OPERATION

1997/2/11    9:13:33     POWER ON
1997/2/11    9:13:40     READ PATTERN  Fun3   NO. OF STITCH=0004325
1997/2/11    9:15:34     START SEWING
1997/2/11    9:20:40     CHANGE COLOR  NEW NEEDLE ROD=02  NO. OF STITCH=0000203
1997/2/11   10:04:40    CHANGE COLOR  NEW NEEDLE ROD=03  NO. OF STITCH=0001203
1997/2/11   10:05:50    CHANGE COLOR  NEW NEEDLE ROD=04  NO. OF STITCH=0001303
1997/2/11   10:10:50    PAUSE BUTTON HALT
1997/2/11   10:14:34    RESTART
1997/2/11   10:15:50    THREAD BROKEN HALT  HEAD=01  NEEDLE ROD=04  NO. OF STITCH=0001303  SPEED RANGE=01
1997/2/11   10:17:34    RESTART
1997/2/11   10:20:34    END
1997/2/11   11:23:29    POWER OFF
1997/2/11   15:13:33    POWER ON
1997/2/11   15:13:40    READ PATTERN  Fun3   NO. OF STITCH=0004325
1997/2/11   14:15:34    START SEWING
1997/2/11   14:20:40    CHANGE COLOR  NEW NEEDLE ROD=02  NO. OF STITCH=0000203
1997/2/11   15:04:40    CHANGE COLOR  NEW NEEDLE ROD=03  NO. OF STITCH=0001203
1997/2/11   15:05:50    CHANGE COLOR  NEW NEEDLE ROD=04  NO. OF STITCH=0001303
1997/2/11   15:10:50    PAUSE BUTTON HALT
1997/2/11   15:14:34    RESTART
1997/2/11   16:15:50    THREAD BROKEN HALT  HEAD=01  NEEDLE ROD=04  NO. OF STITCH=0001303  SPEED RANGE=01
1997/2/11   16:17:34    RESTART
1997/2/11   16:20:34    END
1997/2/11   17:23:29    POWER OFF

FIG. 5

| | | |
|---|---|---|
| 1997/2/12 | 9:13:33 | POWER ON |
| 1997/2/12 | 9:13:40 | READ PATTERN Fun3 NO. OF STITCH=0004325 |
| 1997/2/12 | 9:15:34 | START SEWING |
| 1997/2/12 | 9:20:40 | CHANGE COLOR NEW NEEDLE ROD=02 NO. OF STITCH=0000203 |
| 1997/2/12 | 10:04:40 | CHANGE COLOR NEW NEEDLE ROD=03 NO. OF STITCH=0001203 |
| 1997/2/12 | 10:05:50 | CHANGE COLOR NEW NEEDLE ROD=04 NO. OF STITCH=0001303 |
| 1997/2/12 | 10:10:50 | PAUSE BUTTON HALT |
| 1997/2/12 | 10:14:34 | RESTART |
| 1997/2/12 | 10:15:50 | THREAD BROKEN HALT HEAD=01 NEEDLE ROD=04 NO. OF STITCH=0001303 SPEED RANGE=01 |
| 1997/2/12 | 10:17:34 | RESTART |
| 1997/2/12 | 10:20:34 | END |
| 1997/2/12 | 11:23:29 | POWER OFF |
| 1997/2/12 | 15:13:33 | POWER ON |
| 1997/2/12 | 15:13:40 | READ PATTERN Fun3 NO. OF STITCH=0004325 |
| 1997/2/12 | 14:15:34 | START SEWING |
| 1997/2/12 | 14:20:40 | CHANGE COLOR NEW NEEDLE ROD=02 NO. OF STITCH=0000203 |
| 1997/2/12 | 15:04:40 | CHANGE COLOR NEW NEEDLE ROD=03 NO. OF STITCH=0001203 |
| 1997/2/12 | 15:05:50 | CHANGE COLOR NEW NEEDLE ROD=04 NO. OF STITCH=0001303 |
| 1997/2/12 | 15:10:50 | PAUSE BUTTON HALT |
| 1997/2/12 | 15:14:34 | RESTART |
| 1997/2/12 | 16:15:50 | THREAD BROKEN HALT HEAD=01 NEEDLE ROD=04 NO. OF STITCH=0001303 SPEED RANGE=01 |
| 1997/2/12 | 16:17:34 | RESTART |
| 1997/2/12 | 16:20:34 | END |
| 1997/2/12 | 17:23:29 | POWER OFF |

FIG. 6

| | | |
|---|---|---|
| 1997/2/13 | 9:13:33 | POWER ON |
| 1997/2/13 | 9:13:40 | READ PATTERN Fun3  NO. OF STITCH=0004325 |
| 1997/2/13 | 9:15:34 | START SEWING |
| 1997/2/13 | 9:20:40 | CHANGE COLOR  NEW NEEDLE ROD=02  NO. OF STITCH=0000203 |
| 1997/2/13 | 10:04:40 | CHANGE COLOR  NEW NEEDLE ROD=03  NO. OF STITCH=0001203 |
| 1997/2/13 | 10:05:50 | CHANGE COLOR  NEW NEEDLE ROD=04  NO. OF STITCH=0001303 |
| 1997/2/13 | 10:10:50 | PAUSE BUTTON HALT |
| 1997/2/13 | 10:14:34 | RESTART |
| 1997/2/13 | 10:15:50 | THREAD BROKEN HALT  HEAD=01  NEEDLE ROD=04  NO. OF STITCH=0001303  SPEED RANGE=01 |
| 1997/2/13 | 10:17:34 | RESTART |
| 1997/2/13 | 10:20:34 | END |
| 1997/2/13 | 11:23:29 | POWER OFF |
| 1997/2/13 | 15:13:33 | POWER ON |
| 1997/2/13 | 15:13:40 | READ PATTERN Fun3  NO. OF STITCH=0004325 |
| 1997/2/13 | 14:15:34 | START SEWING |
| 1997/2/13 | 14:20:40 | CHANGE COLOR  NEW NEEDLE ROD=02  NO. OF STITCH=0000203 |
| 1997/2/13 | 15:04:40 | CHANGE COLOR  NEW NEEDLE ROD=03  NO. OF STITCH=0001203 |
| 1997/2/13 | 15:05:50 | CHANGE COLOR  NEW NEEDLE ROD=04  NO. OF STITCH=0001303 |
| 1997/2/13 | 15:10:50 | PAUSE BUTTON HALT |
| 1997/2/13 | 15:14:34 | RESTART |
| 1997/2/13 | 16:15:50 | THREAD BROKEN HALT  HEAD=01  NEEDLE ROD=04  NO. OF STITCH=0001303  SPEED RANGE=01 |
| 1997/2/13 | 16:17:34 | RESTART |
| 1997/2/13 | 16:20:34 | END |
| 1997/2/13 | 17:23:29 | POWER OFF |

FIG. 7

| Date | Time | Event |
|---|---|---|
| 1997/2/14 | 9:13:33 | POWER ON |
| 1997/2/14 | 9:13:40 | READ PATTERN Fun3  NO. OF STITCH=0004325 |
| 1997/2/14 | 9:15:34 | START SEWING |
| 1997/2/14 | 9:20:40 | CHANGE COLOR  NEW NEEDLE ROD=02  NO. OF STITCH=0000203 |
| 1997/2/14 | 10:04:40 | CHANGE COLOR  NEW NEEDLE ROD=03  NO. OF STITCH=0001203 |
| 1997/2/14 | 10:05:50 | CHANGE COLOR  NEW NEEDLE ROD=04  NO. OF STITCH=0001303 |
| 1997/2/14 | 10:10:50 | PAUSE BUTTON HALT |
| 1997/2/14 | 10:14:34 | RESTART |
| 1997/2/14 | 10:15:50 | THREAD BROKEN HALT  HEAD=01  NEEDLE ROD=04  NO. OF STITCH=0001303  SPEED RANGE=01 |
| 1997/2/14 | 10:17:34 | RESTART |
| 1997/2/14 | 10:20:34 | END |
| 1997/2/14 | 11:23:29 | POWER OFF |
| 1997/2/14 | 15:13:33 | POWER ON |
| 1997/2/14 | 15:13:40 | READ PATTERN Fun3  NO. OF STITCH=0004325 |
| 1997/2/14 | 14:15:34 | START SEWING |
| 1997/2/14 | 14:20:40 | CHANGE COLOR  NEW NEEDLE ROD=02  NO. OF STITCH=0000203 |
| 1997/2/14 | 15:04:40 | CHANGE COLOR  NEW NEEDLE ROD=03  NO. OF STITCH=0001203 |
| 1997/2/14 | 15:05:50 | CHANGE COLOR  NEW NEEDLE ROD=04  NO. OF STITCH=0001303 |
| 1997/2/14 | 15:10:50 | PAUSE BUTTON HALT |
| 1997/2/14 | 15:14:34 | RESTART |
| 1997/2/14 | 16:15:50 | THREAD BROKEN HALT  HEAD=01  NEEDLE ROD=04  NO. OF STITCH=0001303  SPEED RANGE=01 |
| 1997/2/14 | 16:17:34 | RESTART |
| 1997/2/14 | 16:20:34 | END |
| 1997/2/14 | 17:23:29 | POWER OFF |

FIG. 9

PROPERTY OF DISPLAYED ITEM

| PRODUCED AMOUNT | TOTAL PRODUCTION | REST/TIME SETTING |

| GENERAL SETTING | DETAILED SETTING | THREAD BROKEN(M) | THREAD BROKEN(P) |

PROCESSING PERIOD
- ○ MONTH  CLOSING DAY  [31] ◀▶
- ● WEEK  CLOSING DAY OF THE WEEK  [FRI] ▶
- ○ DAY  CLOSING HOUR  [14] ◀▶
- ○ YESTERDAY

☑ USE FREE TIME ZONES

SUBJECTED SEWING MACHINE
[AAAAAA] ▶

TIME ZONE SETTING
- A ● ◀▶ [07:00] ~ ◀▶ [15:00]
- B ○ ◀▶ [15:00] ~ ◀▶ [23:00]
- C ○ ◀▶ ~ ◀▶

RETENTION PERIOD
- ● 1 YEAR
- ○ 6 MONTHS
- ○ 3 MONTHS
- ○ 1 MONTH
- ○ 2 WEEKS
- ○ 1 WEEK

[OK]  [CANCEL]

FIG. 11

MACHINE: AAAAAA　　GROUP: A

| DATE | TIME | OPERATION |
|---|---|---|
| 1997/2/11 | 9:13:33 | POWER ON |
| 1997/2/11 | 9:13:40 | READ PATTERN Fun3  NO. OF STITCH=0004325 |
| 1997/2/11 | 9:15:34 | START SEWING |
| 1997/2/11 | 9:20:40 | CHANGE COLOR  NEW NEEDLE ROD=02  NO. OF STITCH=0000203 |
| 1997/2/11 | 10:04:40 | CHANGE COLOR  NEW NEEDLE ROD=03  NO. OF STITCH=0001203 |
| 1997/2/11 | 10:05:50 | CHANGE COLOR  NEW NEEDLE ROD=04  NO. OF STITCH=0001303 |
| 1997/2/11 | 10:10:50 | PAUSE BUTTON HALT |
| 1997/2/11 | 10:14:34 | RESTART |
| 1997/2/11 | 10:15:50 | THREAD BROKEN HALT  HEAD=01 NEEDLE ROD=04  NO. OF STITCH=0001303  SPEED RANGE=01 |
| 1997/2/11 | 10:17:34 | RESTART |
| 1997/2/11 | 10:20:34 | END |
| 1997/2/11 | 11:23:29 | POWER OFF |
| 1997/2/12 | 9:13:33 | POWER ON |
| 1997/2/12 | 9:13:40 | READ PATTERN Fun3  NO. OF STITCH=0004325 |
| 1997/2/12 | 9:15:34 | START SEWING |
| 1997/2/12 | 9:20:40 | CHANGE COLOR  NEW NEEDLE ROD=02  NO. OF STITCH=0000203 |
| 1997/2/12 | 10:04:40 | CHANGE COLOR  NEW NEEDLE ROD=03  NO. OF STITCH=0001203 |
| 1997/2/12 | 10:05:50 | CHANGE COLOR  NEW NEEDLE ROD=04  NO. OF STITCH=0001303 |
| 1997/2/12 | 10:10:50 | PAUSE BUTTON HALT |
| 1997/2/12 | 10:14:34 | RESTART |
| 1997/2/12 | 10:15:50 | THREAD BROKEN HALT  HEAD=01 NEEDLE ROD=04  NO. OF STITCH=0001303  SPEED RANGE=01 |
| 1997/2/12 | 10:17:34 | RESTART |
| 1997/2/12 | 10:20:34 | END |
| 1997/2/12 | 11:23:29 | POWER OFF |

FIG. 12

| | | |
|---|---|---|
| 1997/2/13 | 9:13:33 | POWER ON |
| 1997/2/13 | 9:13:40 | READ PATTERN Fun3  NO. OF STITCH=0004325 |
| 1997/2/13 | 9:15:34 | START SEWING |
| 1997/2/13 | 9:20:40 | CHANGE COLOR  NEW NEEDLE ROD=02  NO. OF STITCH=0000203 |
| 1997/2/13 | 10:04:40 | CHANGE COLOR  NEW NEEDLE ROD=03  NO. OF STITCH=0001203 |
| 1997/2/13 | 10:05:50 | CHANGE COLOR  NEW NEEDLE ROD=04  NO. OF STITCH=0001303 |
| 1997/2/13 | 10:10:50 | PAUSE BUTTON HALT |
| 1997/2/13 | 10:14:34 | RESTART |
| 1997/2/13 | 10:15:50 | THREAD BROKEN HALT  HEAD=01  NEEDLE ROD=04  NO. OF STITCH=0001303  SPEED RANGE=01 |
| 1997/2/13 | 10:17:34 | RESTART |
| 1997/2/13 | 10:20:34 | END |
| 1997/2/13 | 11:23:29 | POWER OFF |
| 1997/2/14 | 9:13:33 | POWER ON |
| 1997/2/14 | 9:13:40 | READ PATTERN Fun3  NO. OF STITCH=0004325 |
| 1997/2/14 | 9:15:34 | START SEWING |
| 1997/2/14 | 9:20:40 | CHANGE COLOR  NEW NEEDLE ROD=02  NO. OF STITCH=0000203 |
| 1997/2/14 | 10:04:40 | CHANGE COLOR  NEW NEEDLE ROD=03  NO. OF STITCH=0001203 |
| 1997/2/14 | 10:05:50 | CHANGE COLOR  NEW NEEDLE ROD=04  NO. OF STITCH=0001303 |
| 1997/2/14 | 10:10:50 | PAUSE BUTTON HALT |
| 1997/2/14 | 10:14:34 | RESTART |
| 1997/2/14 | 10:15:50 | THREAD BROKEN HALT  HEAD=01  NEEDLE ROD=04  NO. OF STITCH=0001303  SPEED RANGE=01 |
| 1997/2/14 | 10:17:34 | RESTART |
| 1997/2/14 | 10:20:34 | END |
| 1997/2/14 | 11:23:29 | POWER OFF |

FIG. 13

MACHINE: AAAAAA    GROUP: B

| DATE | TIME | OPERATION | | | |
|---|---|---|---|---|---|
| 1997/2/11 | 15:13:33 | POWER ON | | | |
| 1997/2/11 | 15:13:40 | READ PATTERN Fun3 | NO. OF STITCH=0004325 | | |
| 1997/2/11 | 14:15:34 | START SEWING | | | |
| 1997/2/11 | 14:20:40 | CHANGE COLOR NEW NEEDLE ROD=02 | NO. OF STITCH=0000203 | | |
| 1997/2/11 | 15:04:40 | CHANGE COLOR NEW NEEDLE ROD=03 | NO. OF STITCH=0001203 | | |
| 1997/2/11 | 15:05:50 | CHANGE COLOR NEW NEEDLE ROD=04 | NO. OF STITCH=0001303 | | |
| 1997/2/11 | 15:10:50 | PAUSE BUTTON HALT | | | |
| 1997/2/11 | 15:14:34 | RESTART | | | |
| 1997/2/11 | 16:15:50 | THREAD BROKEN HALT HEAD=01 NEEDLE ROD=04 | NO. OF STITCH=0001303 | SPEED RANGE=01 | |
| 1997/2/11 | 16:17:34 | RESTART | | | |
| 1997/2/11 | 16:20:34 | END | | | |
| 1997/2/11 | 17:23:29 | POWER OFF | | | |
| 1997/2/12 | 15:13:33 | POWER ON | | | |
| 1997/2/12 | 15:13:40 | READ PATTERN Fun3 | NO. OF STITCH=0004325 | | |
| 1997/2/12 | 14:15:34 | START SEWING | | | |
| 1997/2/12 | 14:20:40 | CHANGE COLOR NEW NEEDLE ROD=02 | NO. OF STITCH=0000203 | | |
| 1997/2/12 | 15:04:40 | CHANGE COLOR NEW NEEDLE ROD=03 | NO. OF STITCH=0001203 | | |
| 1997/2/12 | 15:05:50 | CHANGE COLOR NEW NEEDLE ROD=04 | NO. OF STITCH=0001303 | | |
| 1997/2/12 | 15:10:50 | PAUSE BUTTON HALT | | | |
| 1997/2/12 | 15:14:34 | RESTART | | | |
| 1997/2/12 | 16:15:50 | THREAD BROKEN HALT HEAD=01 NEEDLE ROD=04 | NO. OF STITCH=0001303 | SPEED RANGE=01 | |
| 1997/2/12 | 16:17:34 | RESTART | | | |
| 1997/2/12 | 16:20:34 | END | | | |
| 1997/2/12 | 17:23:29 | POWER OFF | | | |

FIG. 14

| Date | Time | Event |
|---|---|---|
| 1997/2/13 | 15:13:33 | POWER ON |
| 1997/2/13 | 15:13:40 | READ PATTERN Fun3  NO. OF STITCH=0004325 |
| 1997/2/13 | 14:15:34 | START SEWING |
| 1997/2/13 | 14:20:40 | CHANGE COLOR  NEW NEEDLE ROD=02  NO. OF STITCH=0000203 |
| 1997/2/13 | 15:04:40 | CHANGE COLOR  NEW NEEDLE ROD=03  NO. OF STITCH=0001203 |
| 1997/2/13 | 15:05:50 | CHANGE COLOR  NEW NEEDLE ROD=04  NO. OF STITCH=0001303 |
| 1997/2/13 | 15:10:50 | PAUSE BUTTON HALT |
| 1997/2/13 | 15:14:34 | RESTART |
| 1997/2/13 | 16:15:50 | THREAD BROKEN HALT  HEAD=01  NEEDLE ROD=04  NO. OF STITCH=0001303  SPEED RANGE=01 |
| 1997/2/13 | 16:17:34 | RESTART |
| 1997/2/13 | 16:20:34 | END |
| 1997/2/13 | 17:23:29 | POWER OFF |
| 1997/2/14 | 15:13:33 | POWER ON |
| 1997/2/14 | 15:13:40 | READ PATTERN Fun3  NO. OF STITCH=0004325 |
| 1997/2/14 | 14:15:34 | START SEWING |
| 1997/2/14 | 14:20:40 | CHANGE COLOR  NEW NEEDLE ROD=02  NO. OF STITCH=0000203 |
| 1997/2/14 | 15:04:40 | CHANGE COLOR  NEW NEEDLE ROD=03  NO. OF STITCH=0001203 |
| 1997/2/14 | 15:05:50 | CHANGE COLOR  NEW NEEDLE ROD=04  NO. OF STITCH=0001303 |
| 1997/2/14 | 15:10:50 | PAUSE BUTTON HALT |
| 1997/2/14 | 15:14:34 | RESTART |
| 1997/2/14 | 16:15:50 | THREAD BROKEN HALT  HEAD=01  NEEDLE ROD=04  NO. OF STITCH=0001303  SPEED RANGE=01 |
| 1997/2/14 | 16:17:34 | RESTART |
| 1997/2/14 | 16:20:34 | END |
| 1997/2/14 | 17:23:29 | POWER OFF |

FIG. 17

```
PRODUCED AMOUNT

MACHINE: AAAAAA              GROUP: A

NO.
#1
        PATTERN              Fun3        PATTERN STITCH         4325
        TOTAL STITCH         17300       COLOR CHANGE              3
        NUMBER OF OPERATIONS     4       PRODUCED AMOUNT          24
        TOTAL OPERATING PERIOD  4:20:00  AVERAGE SPEED        65 spm
        TOTAL SEWING PERIOD     3:58:08  AVERAGE SPEED        72 spm
        PAUSE PERIOD            0:21:52  OPERATION RATE       91.60%
```

FIG. 18

```
PRODUCED AMOUNT

MACHINE: AAAAAA              GROUP: B

NO.
#1
        PATTERN              Fun3        PATTERN STITCH         4325
        TOTAL STITCH         17300       COLOR CHANGE              3
        NUMBER OF OPERATIONS     4       PRODUCED AMOUNT          24
        TOTAL OPERATING PERIOD  4:22:00  AVERAGE SPEED        65 spm
        TOTAL SEWING PERIOD     3:58:08  AVERAGE SPEED        72 spm
        PAUSE PERIOD            0:23:52  OPERATION RATE       90.90%
```

DATA PROCESSING DEVICE FOR PATTERN SEWING SYSTEM

BACKGROUND OF THE INVENTION

The present invention relates to an operation data processing device for processing work data regarding operation status of pattern sewing system including pattern sewing machines.

Conventionally, a pattern sewing system provided with one or more pattern sewing machines such as an embroidery sewing machine, or a sewing machine for sewing a predetermined pattern, e.g., a pocket setter, have been known. In a production management system for products to which patterns are sewn by such pattern sewing machines, operation status of the pattern sewing machines is recorded as log files, and operation data representing production volume, rate of operation and the like is generated based on the contents of the log files. Such operation data is referred to as management data for improving the production volume and the rate of the operation of the pattern sewing system.

If, in such a pattern sewing system, the same pattern sewing machine is used by a plurality of operator groups alternately (e.g., in three shifts a day), the operation status of the pattern sewing machine is recorded in the same log file, and accordingly it was troublesome to analyze the data on a group basis, or generate the operation data for each group.

SUMMARY OF THE INVENTION

It is therefore an object of the invention to provide an improved data processing device with which the operation data of the pattern sewing machines can be obtained on a group basis even if the same pattern sewing machine is used alternately by a plurality of operation data groups.

For the above object, according to the present invention, there is provided a data processing device for processing data representing an operation status of a pattern sewing system which includes at least one pattern sewing machine alternately operated by a plurality of operator groups. The data processing device may include a time zone setting device which sets a plurality of time zones, during which a plurality of operator groups operate the pattern sewing machine, respectively, an operation status detecting device which detects an operation status of the at least one pattern sewing machine, a log data recording device which records the operation status of the pattern sewing machine detected by the operation status detecting device as log data, and an operation data creating device which creates operation data representing a predetermined operation parameter for each of a plurality of operator groups based on a plurality of time zones set by the time zone setting device and the log data recorded by the log data recording device.

With this construction, the operation data of the pattern sewing machines can be obtained automatically on a group basis even if the same pattern sewing machine is used alternately by a plurality of operator groups.

Optionally, the operation data creating device may include a work data creating device for creating a plurality of work files by extracting data corresponding to a plurality of time zones from the log data, respectively, the operation data being generated based on a plurality of work files.

Further optionally, the operation data creating device may create the operation data based on the log data obtained within a predetermined period. In this case, the predetermined period can be one of a month, a week, and a day.

Still optionally, the data processing device may include a period setting device for setting a period of time, and wherein the operation data creating device creates the operation data based on the log data obtained within the period set by the period setting device. In this case, the period setting device sets the period by selecting one of a plurality of predetermined periods, such as a month, a week or a day.

Yet optionally, the operation data creating device extracts a predetermined series of operations corresponding to each of a plurality of time zones and creates the operation data for each of a plurality of operator groups. In this case, the predetermined series of operations starts when a sewing operation of the pattern sewing machine is started and the predetermined series of operations ends when the sewing operation of the sewing machine is terminated.

In this case, the operation data creating device may create the operation data for a plurality of operator groups if the series of operations starts within one of a plurality of time zones.

Alternatively, the operation data creating device may create the operation data for a plurality of operator groups if the series of operations ends within one of a plurality of time zones.

It is preferable that, if the predetermined series of operations is executed over more than one time zones, the operation data creating device creates the operation data for operator groups, which corresponds to the more than one time zones, in proportion to periods of time spent by the operator groups, respectively.

It is preferable that the predetermined operation parameter comprises a produced amount of the pattern sewing machine.

Alternatively or optionally, the predetermined operation parameter comprises a rate of operation of the pattern sewing machine.

According to another aspect of the invention, there is provided a data processing device for processing data representing an operation status of a pattern sewing system, the pattern sewing system including at least one pattern sewing machine, a series of operations defining a sewing operation, a plurality of sewing operations being executed by the at least one pattern sewing machine, the data processing device comprising: a log data recording device, which records an operation status of the at least one pattern sewing machine as log data; a controller which categorizes the plurality of sewing operations into a plurality of operation groups based on a time zone in which each of the plurality of sewing operations is executed; and an operation data creating device, which creates operation data representing a predetermined operation parameter corresponding to each of the operation groups based on the log data.

According to further aspect of the invention, there is provided a data processing device for processing data representing an operation status of a pattern sewing system, the pattern sewing system including at least one pattern sewing machine which is alternately operated by a plurality of operator groups, the data processing device comprising: time zone setting means for setting a plurality of time zones, the plurality of operator groups operating the at least one pattern sewing machine during the plurality of time zones, respectively; operation status detecting means for detecting an operation status of the at least one pattern sewing machine; log data recording means for recording the operation status of the at least one pattern sewing machine detected by the operation status detecting means as log data; and operation data creating means for creating operation data representing a predetermined operation parameter for each of the plurality of operator groups based on the plurality of time zones set by the time zone setting means and the log data recorded by the log data recording means.

Optionally, the operation data creating means comprises a work data creating means for creating a plurality of work files by extracting data corresponding to the plurality of time zones from the log data, respectively, the operation data being generated based on the plurality of work files.

According to furthermore aspect of the invention, there is provided a memory medium storing a program executed by a data processing device for processing data representing an operation status of a pattern sewing system, the pattern sewing system including at least one pattern sewing machine which is alternately operated by a plurality of operator groups, the program comprising steps of: repeatedly executing steps of: (1) detecting an operation status of the at least one pattern sewing machine, and (2) recording the operation status of the at least one pattern sewing machine as log data; setting a plurality of time zones, the plurality of operator groups operating the at least one pattern sewing machine during the plurality of time zones, respectively; and creating operation data representing a predetermined operation parameter for each of the plurality of operator groups based on the plurality of time zones and the log data.

Optionally, the step of creating the operation data may include a step of creating a plurality of work files by extracting data corresponding to the plurality of time zones from the log data, respectively, the operation data being generated based on the plurality of work files.

Further, the step of creating the operation data may further include a step of creating the operation data based on the log data which is obtained within a predetermined period.

According to another aspect of the invention, there is provided a data processing device for processing data representing an operation status of a pattern sewing system, the pattern sewing system including at least one pattern sewing machine which is alternately operated by a plurality of operator groups, the data processing device comprising: an operation status detecting device, which detects an operation status of the at least one pattern sewing machine; a log data recording device, which records the operation status of the at least one pattern sewing machine detected by the operation status detecting device as log data, the log data recording device records identifying data which can be used for identifying each of the plurality of operator groups together with the operation status; and an operation data creating device, which creates operation data representing a predetermined operation parameter for each of the plurality of operator groups based on the identifying data and the log data recorded by the log data recording device.

Accordingly, if the log data includes data which can be used for identifying each of the operator groups, the operation data for each of the operator groups can be obtained.

BRIEF DESCRIPTION OF THE DRAWINGS

FIGS. 4 through 7 show exemplary data of a log file;

FIG. 9 shows a dialog box displayed on a CRT (Cathode Ray Tube) display when the time zone setting procedure is executed;

FIGS. 11 and 12 show exemplary data of a work data file for group A;

FIGS. 13 and 14 show exemplary data of a work data file for group B;

FIG. 17 shows an example of the operation data for group A as displayed on the CRT display; and FIG. 18 shows an example of the operation data for group B as displayed on the CRT display.

DETAILED DESCRIPTION OF THE PREFERRED EMBODIMENTS

Figure 1:
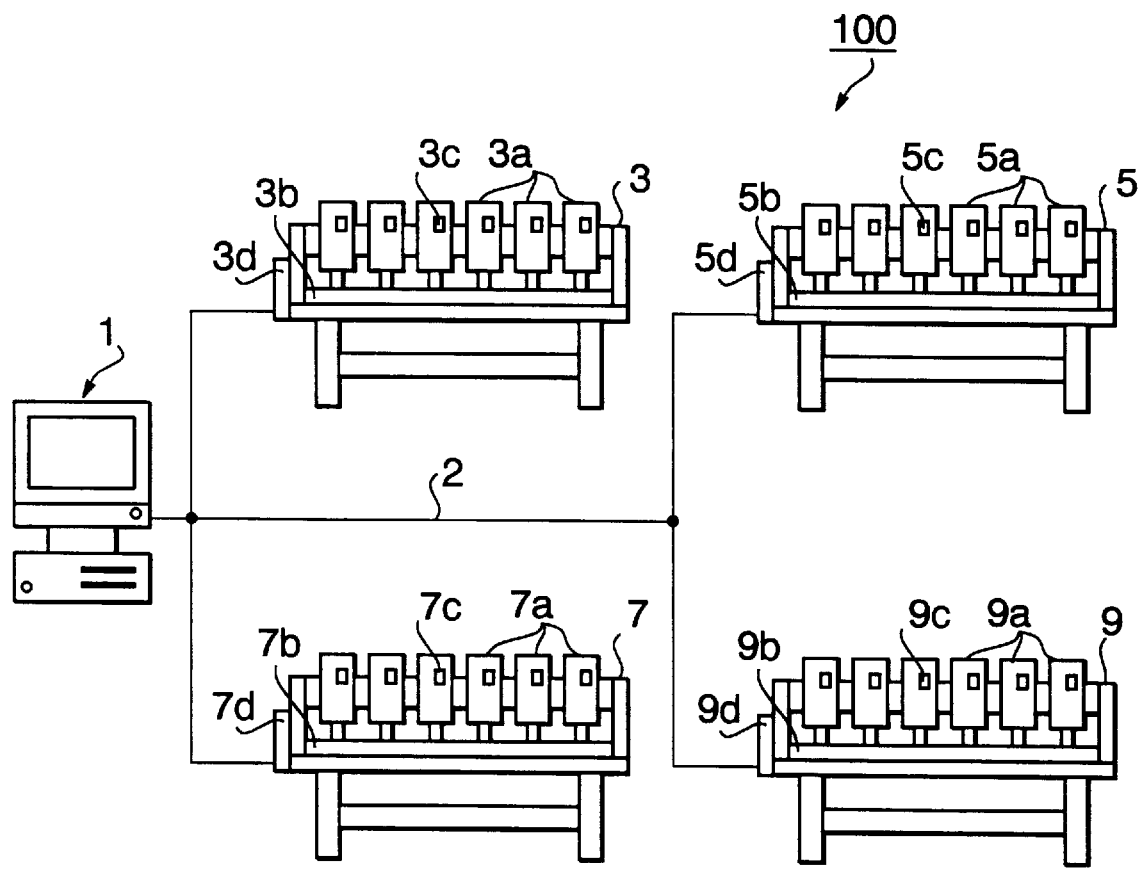
FIG. 1 shows a schematic construction of a pattern sewing machine system employing a data processing device according to an embodiment of the invention.

FIG. 1 shows a schematic construction of a pattern sewing machine system 100 employing a data processing device according to an embodiment of the present invention.

The pattern sewing machine system 100 includes a personal computer 1, and a plurality of multi-head pattern sewing machines 3, 5, 7 and 9. The multi-head pattern sewing machines 3, 5, 7 and 9 are connected to the personal computer 1 through a cable 2. It should be noted that although four pattern sewing machines are provided in the pattern sewing machine system 100 according to the present embodiment, the number of the pattern sewing machines is not limited to this number.

The multi-head pattern sewing machines 3, 5, 7 and 9 respectively have a plurality of sewing heads 3a, 5a, 7a and 9a, work cloth holding frames 3b, 5b, 7b and 9b, and controlling devices 3d, 5d, 7d and 9d. The personal computer 1 is connected with the controlling devices 3d, 5d, 7d, and 9d through the cable 2. On the sewing heads 3a, 5a, 7a, and 9a, stop switches 3c, 5c, 7c and 9c for manually stopping each of the operation of the sewing head 3a, 5a, 7a and 9a are provided, respectively.

Figure 2:
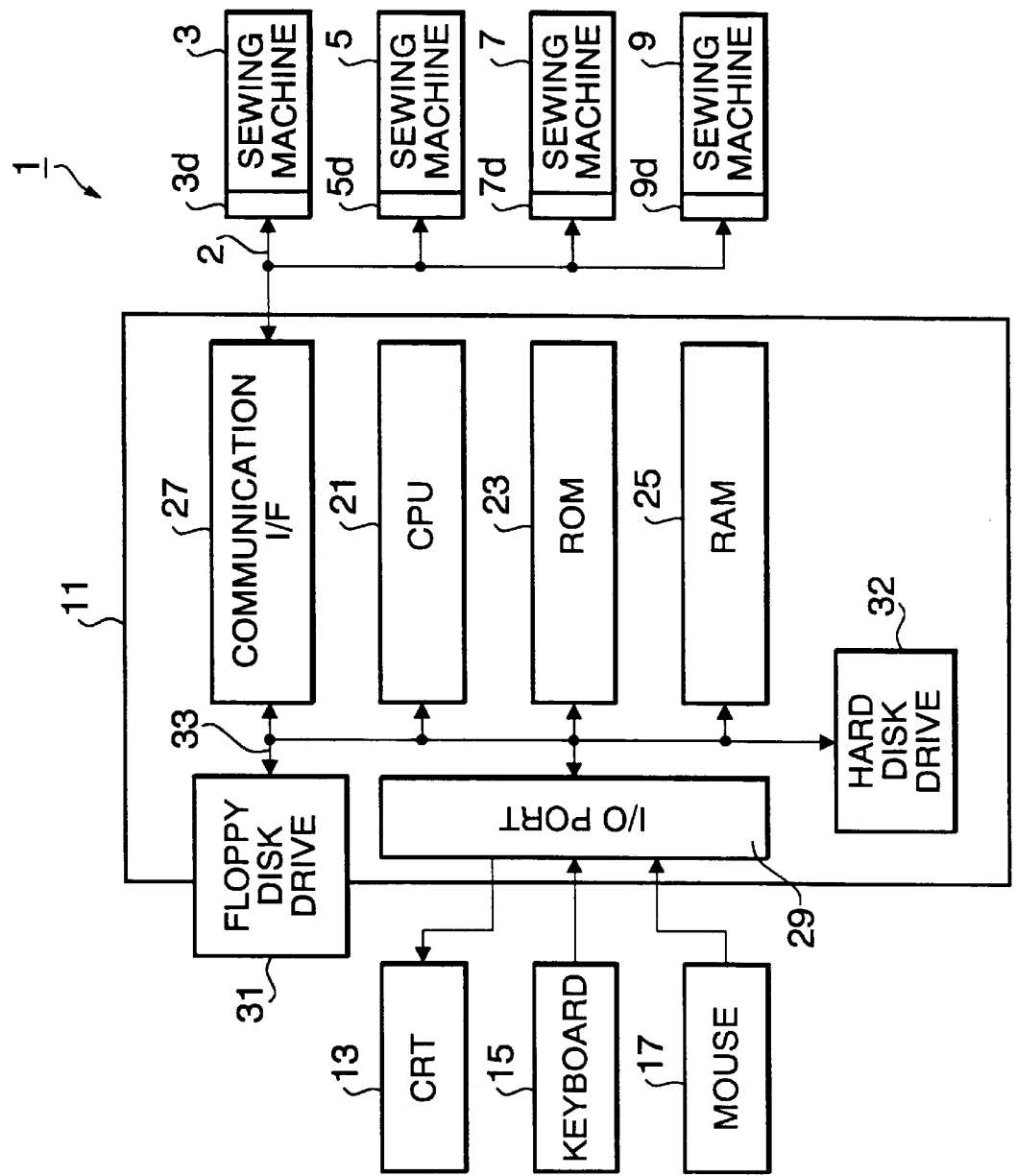
FIG. 2 is a block diagram illustrating a control system of a personal computer employed in the pattern sewing machine system shown in FIG. 1.

FIG. 2 is a block diagram illustrating a control system of the personal computer 1 shown in FIG. 1. The personal computer 1 has a main body 11, a CRT (Cathode Ray Tube) display 13, a keyboard 15 and a mouse 17.

The main body 11 of the personal computer 1 includes a CPU (Central Processing Unit) 21, a ROM (Read Only Memory) 23, a RAM (Random Access Memory) 25, a communication interface (I/F) 27 for communicating with the multi-head pattern sewing machines 3, 5, 7 and 9 through the cable 2, an input/output (I/O) port 29 through which data is transmitted from the CPU 21 to the CRT 13, and from the keyboard 15 and the mouse 17 to the CPU 21. Further, the main body 11 includes a floppy disk drive 31 for reading/writing data to/from a floppy disk (not shown), and a hard disk drive 32 for reading/writing data to/from a hard disk (not shown). Data can be exchanged among the CPU 21, the ROM 23, the RAM 25, the communication I/F 27, the I/O port 29, the floppy disk drive 31, and the hard disk drive 32 through a bus 33.

When a floppy disk, in which a plurality of kinds of pattern data is stored, is inserted in the floppy disk drive 31, and a predetermined command is input through keyboard 15, the CPU 21 executes a program stored in the ROM 23, selects one piece of the pattern data and transmits the selected pattern data to the controlling devices 3d, 5d, 7d and 9d so that a sewing procedure is executed.

The controlling devices 3d, 5d, 7d and 9d transmit operation condition data indicative of operation status of the controlling devices 3d, 5d, 7d and 9d, an ON/OFF status of each of the stop switches 3c, 5c, 7c and 9c, and the like to the personal computer 1 together with identification numbers of the pattern sewing machines 3, 5, 7 and 9.

Upon receipt of the operation condition data from the controlling devices 3d, 5d, 7d and 9d, the personal computer 1 (the CPU 21) initiates a log recording procedure for storing log files in the floppy disk inserted in the floppy disk drive or in a hard disk accommodated in the hard disk drive 32.

Figure 3:
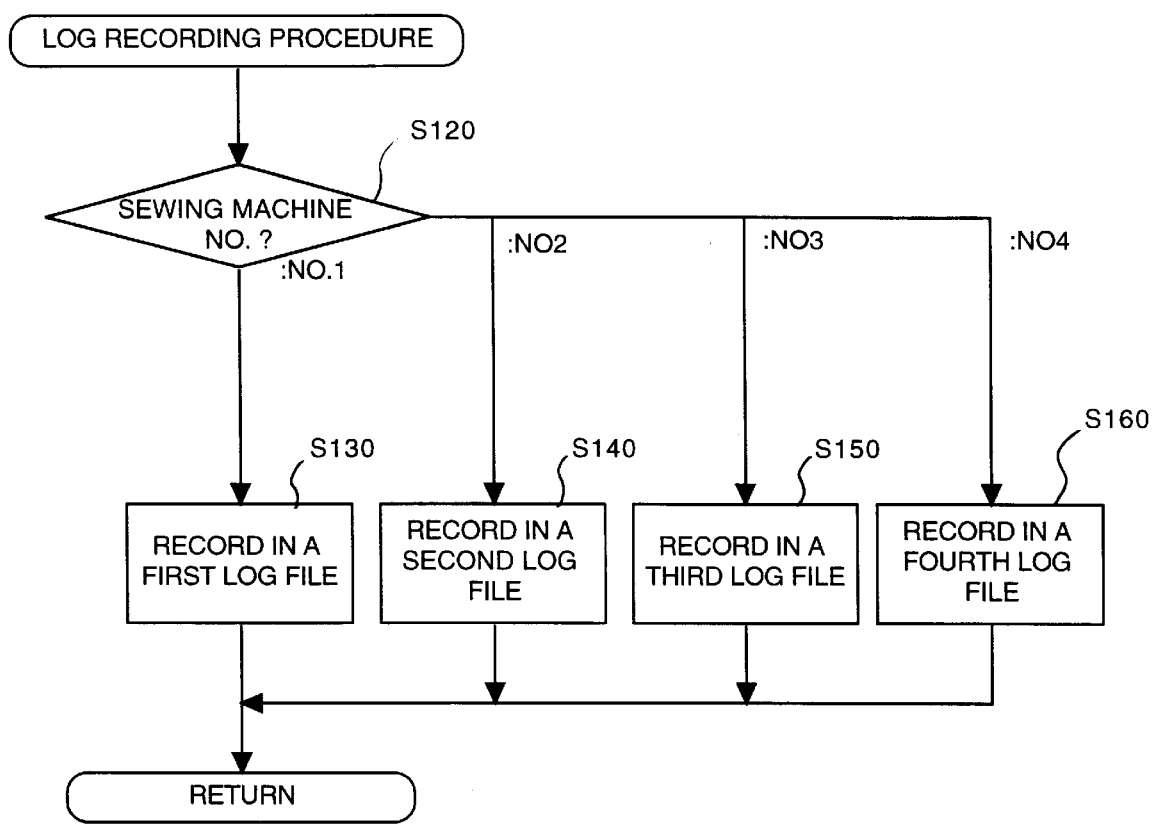
FIG. 3 is a flowchart illustrating a log recording procedure executed by the personal computer shown in FIG. 1.

The log recording procedure is described with reference to a flowchart shown in FIG. 3. The log recording procedure is an interrupting procedure which is executed when the personal computer 1 has received the operation condition data.

When the operation condition data is transmitted through the communication interface 27 into the RAM 25, the CPU 21 identifies the pattern sewing machine based on the identification number associated with the transmitted operation condition data (S120). Then, the transmitted operation condition data is recorded in a log file, which is stored in the floppy disk, for the identified sewing machine (S130, S140, S150 or S160). In the present example, the identification (ID) numbers for the pattern sewing machines 3, 5, 7 and 9 are 1, 2, 3 and 4, respectively. If, for example, the transmitted operation condition data is related to the pattern sewing machine 3, the ID (identification) number thereof is 1, and the operation condition data is recorded in a first log file stored in the floppy disk (S130).

It should be noted that the number of the log files stored in the floppy disk coincides with the number of the pattern sewing machines.

FIGS. 4 through 7 are exemplary log files. In the log file, as shown in the drawings, a date, a time, and an operation item are recorded every time when an operation is carried out. The operation items are, for example, "POWER ON", "RETRIEVAL OF PATTERN", and the like as shown in the drawings.

Operation data will be created based on thus recorded operation condition data in the log files. Creation of the operation data will be described in detail later. It should be noted that, for simplifying explanation of creation of the operation data, FIGS. 4 though 7 show simplified data. In practice, the log files would be more complicated.

Figure 8:
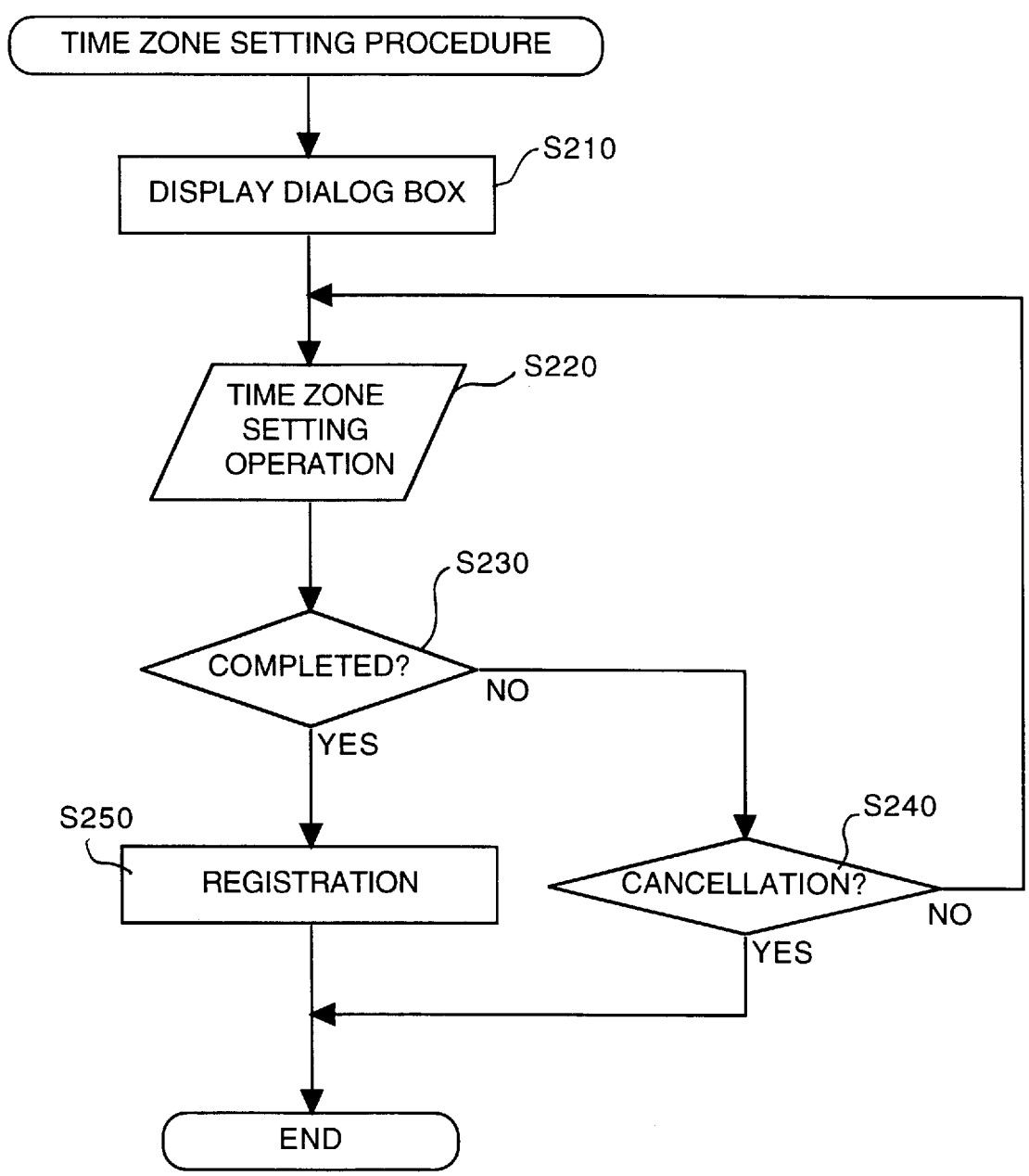
FIG. 8 is a flowchart illustrating a time zone setting procedure.

Prior to creation of the operation data, a time zone setting procedure illustrated in a flowchart shown in FIG. 8 is to be executed.

When the time zone setting procedure is initiated, a dialog box for setting time zones is displayed on the CRT display 13 (S210). An example of the dialog box 40 is shown in FIG. 9. Then, with use of the dialog box 40, time zone data is input (S220).

As shown in FIG. 9, when the time zones are to be set, the dialog box 40 shows a general setting screen on which four areas "PROCESSING PERIOD", "SUBJECTED SEWING MACHINE", "TIME ZONE SETTING", and "RETENTION PERIOD" are available for setting the time zones.

In the "PROCESSING PERIOD" area, a period with respect to which the operation data is created based on the log files is set. The "PROCESSING PERIOD" area of the dialog box 40 includes four radio buttons 40a corresponding to four period items "MONTH", "WEEK", "DAY" and "YESTERDAY". By locating a mouse pointer (not shown) on one of the radio buttons 40a and clicking a mouse button (not shown) of the mouse 17, one of the period items can be selected. If the radio button 40a of "MONTH", "WEEK", or "DAY" is selected, an optional item of "CLOSING DAY", "CLOSING DAY OF THE WEEK" or "CLOSING HOUR" can be selectively set in selection boxes 40b.

If a check box 40c for time zone setting is checked with use of the mouse 17, time zones can be set arbitrarily using radio buttons 40d and time zone selection boxes 40e. Adjacent to the radio buttons 40d, names 40k of operator groups A, B and C are indicated. In order to set the time zone during which the operator group A operate the sewing machine, one of the radio buttons 40d next to the name A of the group is clicked. Then, it becomes possible to change the time setting in the time zone selection box 40e for the operator group A. In should be note that, the time setting in the time zone selection boxes 40e cannot be changed if the corresponding radio buttons 40d are not selected. With use of a list box 40f, one of the pattern sewing machines 3, 5, 7 or 9 connected to the personal computer 1 can be selected by name.

It is assumed, for example, that the pattern sewing machine 3 is represented by a name "AAAAAA", and the operator group A works on the sewing machine 3 from 7:00 to 15:00, and the operator group B works on the sewing machine from 15:00 to 23:00. The operator group C does not work or the operation data for the operator group C is unnecessary. In this case, as shown in the list box 40f, "AAAAAA" is selected as the subjected sewing machine, and two time zones: a first time zone "7:00–15:00" and a second time zone "15:00–23:00" are set as the arbitrarily set time zones for the operator groups A and B, respectively. Thus, through the dialog box 40, a plurality of time zones can be determined in relation to a plurality of operator groups.

By selecting one of the radio buttons 40i, one of the retention periods: "1 YEAR", "6 MONTHS", "3 MONTHS", "1 MONTH", "2 WEEKS" or "1 WEEK" can be selected. The operation data will be retained for the selected period of time after the operation data is created.

Upon selection or input of each item, control proceeds from S220 to S230. Since one of the items is input, determination at S230 is NO, and determination at S240 is also NO. Thus S220 is executed repeatedly.

After each item is set, and an OK button 40g is clicked by the mouse 17 (i.e., the mouse pointer is located at the OK button 40g and the mouse button is clicked), the CPU 21 determines that inputting the time zone setting parameters is completed (S230:YES), and the set items are stored in the RAM 25 as well as in the hard disk of the hard disk drive 32 (S250). Then, the time zone setting procedure is terminated.

If a cancel button 40h is clicked instead of the OK button 40g (S230:NO and S240:YES), the set items are invalidated, and the time zone setting procedure is terminated. In this case, if the time zones were set before, the set values remain effective. If the time zones have not yet set previously, default settings may be effective.

It the example shown in FIG. 9, two time zones for the operator groups A and B are set as the arbitrarily set time zones. An operation data creating procedure in accordance with this exemplary settings will be described with reference to a flowchart shown in FIG. 10.

Figure 10:
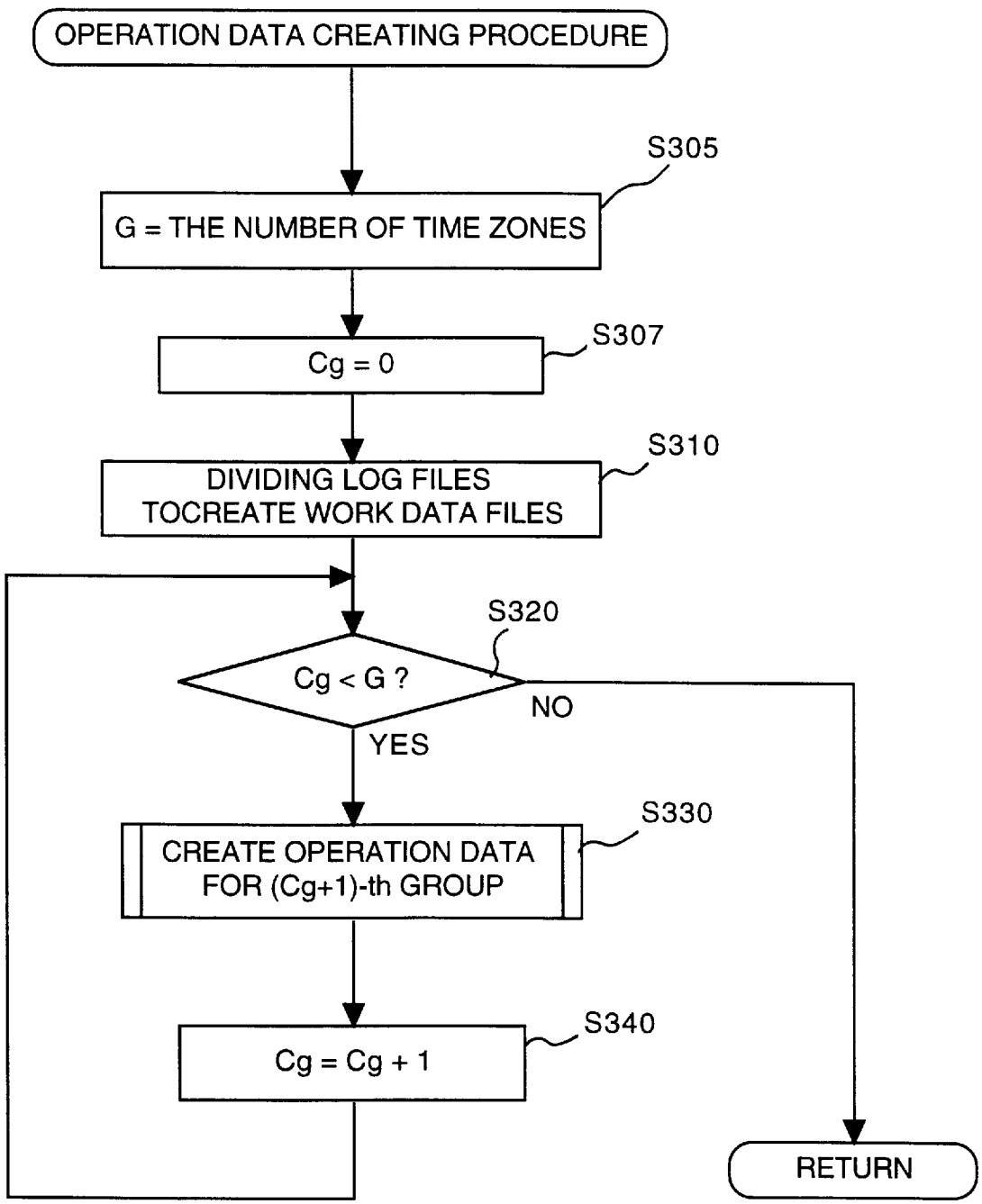
FIG. 10 is a flowchart illustrating an operation data creating procedure.

FIG. 10 shows the operation data creating procedure. At S305, a variable G is set to the number of time zones which has been set in the time zone setting procedure. According to the above exemplary setting, G is set to 2. At S307, a counter Cg is cleared, i.e., set to zero. Then, the contents of the log files shown in FIGS. 4 through 7 are divided into two work data files in accordance with the set time zones (S310). Specifically, among the items in the log files shown in FIGS. 4 through 7, ones which occur within a first time zone (i.e., 7:00–15:00) are extracted and recorded in the first work data file, and ones which occur within a second time zone (i.e., 15:00–23:00) are recorded in the second work data file. The above operation at S310 is applied to the data within a period which has been set in the dialog box 40. In this example, as shown in FIG. 9, the period is set to a week (closing day of the week being set to be Friday), and accordingly, the above-described operation for dividing the log files (i.e., creating the work data files) is applied to the data for the week (operation has actually been performed for four days, from Feb. 11, 1997 (Wednesday) to Feb. 14, 1997 (Friday)). It should be noted that in each work data file may include a plurality of blocks of data, and each block of data should start with "POWER ON" and end with "POWER OFF". Accordingly, if the time at which power is ON is within one of the first or second time zones, a block of data starting from the "POWER ON" operation is included in the corresponding one of the data files. On the other hand, if the time of the "POWER ON" operation is out of the first or second time zones, a block of data starting from the "POWER ON" operation are not included in the work data file.

FIGS. 11 and 12 show the work data file for group A; and FIGS. 13 and 14 show the work data file for group B.

After the work data files are created, it is determined whether the counter Cg is less than the number G of the groups (S120).

In the present example, since the counter Cg was set to zero, and the number G equals to 2 (S320:YES), the operation data for the (Cg+1)-th group, i.e., for group A, is created at S330.

Figure 15:
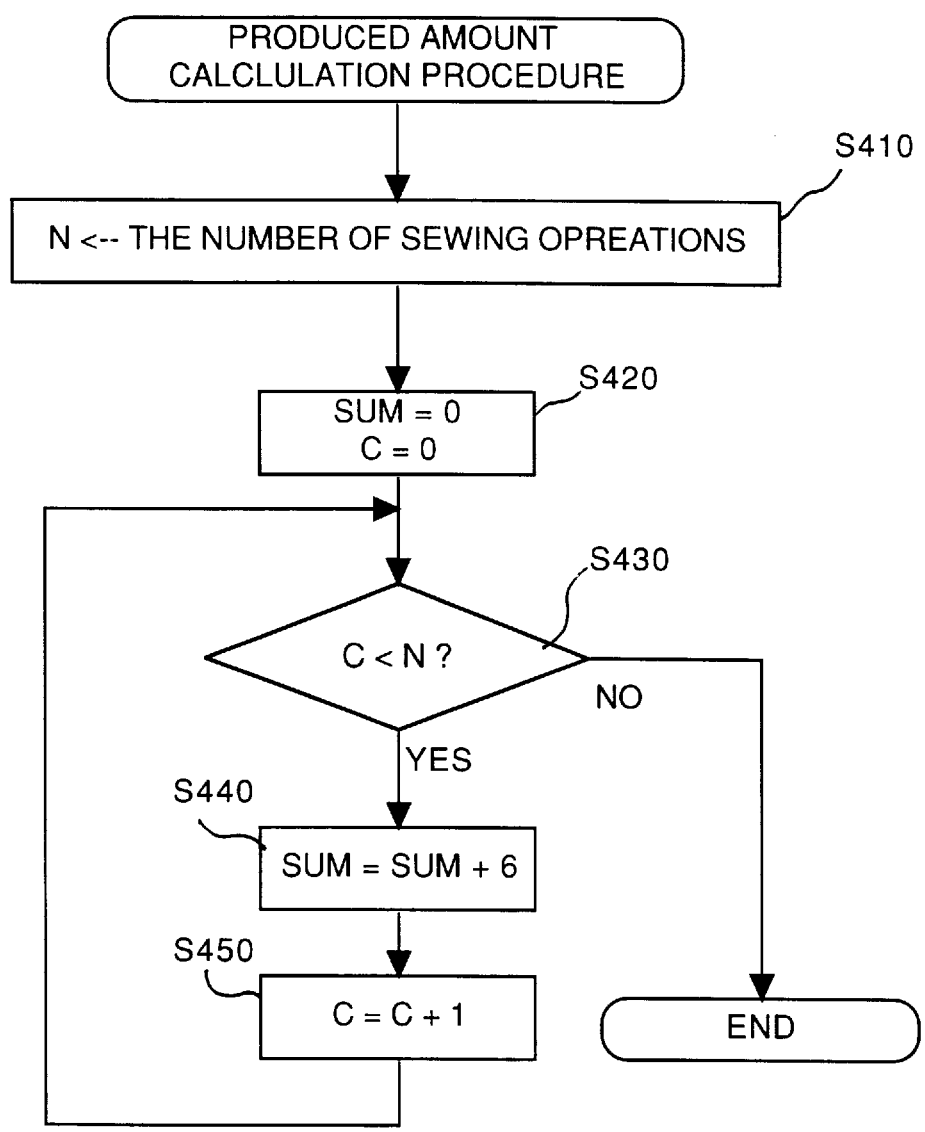
FIG. 15 is a flowchart illustrating a produced amount calculation procedure.
Figure 16:
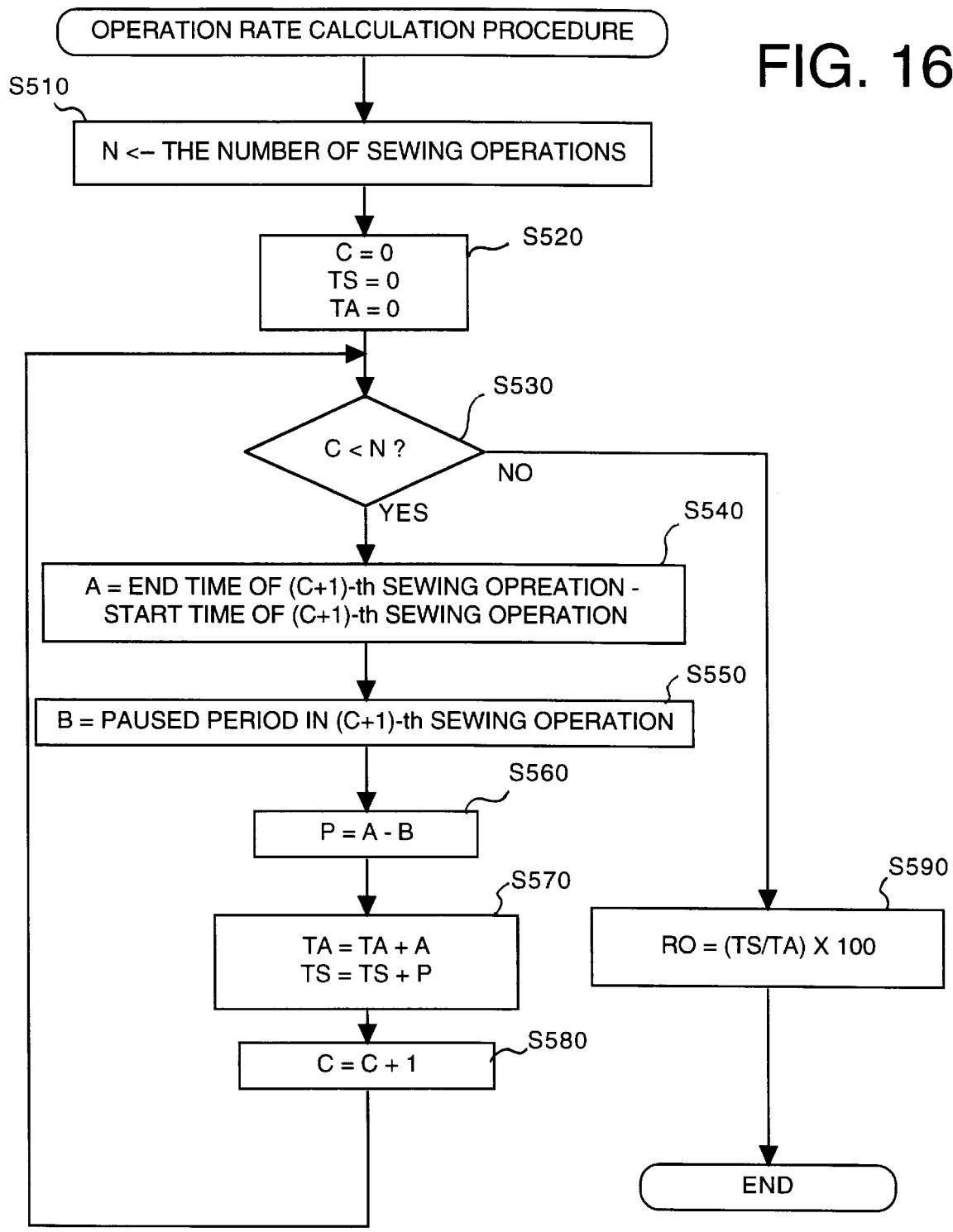
FIG. 16 is a flowchart illustrating an operation rate calculation procedure.

FIGS. 15 and 16 show examples of operation data creating procedures.

FIG. 15 is a flowchart illustrating a produced amount calculation procedure for obtaining the number of work cloths to which the pattern sewing operation has been applied. For this purpose, firstly, an item, "END" which means the end of the sewing operation in the work data file is counted. The number of occurrences of "END" represents the number of sewing operations completed. The counted number of occurrences of "END" is stored in a variable N (S410). In the example of FIGS. 11 and 12, N equals 4.

At S420, a variable SUM representing the total number of sewing operations and a counter C are set to zero. At first, since C=0 and N=4, it is determined that C is less than N (S430:YES). At S440, the variable SUM is set to a sum of the variable SUM and the number of sewing heads 3a of the sewing machine 3. Since the initial value of the variable SUM is zero, the value of the variable SUM is 6. Then, at S450, the counter C is incremented by one, and control returns to S430. Until the counter C becomes equal to the number N of the sewing operations, the variable SUM is increased by 6, and the counter C is incremented by one. When the counter C is equal to the number N (S430:NO), the produced amount calculation procedure is terminated. In this example, when the produced amount calculation procedure is terminated, the variable SUM, i.e., the total number of sewing operations is 24. Thus, as the operation data of group A with respect to the pattern sewing machine 3, the produced amount (i.e., the total number of sewing operations) of 24 is obtained.

FIG. 16 is a flowchart illustrating an operation rate calculation procedure with respect to the sewing machine 3.

At S510, the number of occurrences of "END" in the work data file is counted. As described above, the number of occurrences of "END" represents the number of sewing operations completed. Then a variable N is set to the counted number of occurrences of "END". In the example shown in FIGS. 11 and 12, N equals 4.

At S520, a counter C, and variables TS and TA are set to zero. The variable TS represents the total sewing time period in which the pattern sewing machine 3 is actually operated, and the variable TA represents the total operating time period spent for carrying out the sewing operation.

Firstly, since C=0 and N=4, it is determined at S530 that the counter C is less than the number N of sewing operations (S530:YES). At S540, for the (C+1)-th sewing operation, a period A of the sewing operation is calculated by subtracting the start time from the end time of the sewing operation. In the example shown in FIGS. 11 and 12, the first sewing operation starts at 9:15:34 of Feb. 11, 1997, and ends at 10:20:34 of the same date. Accordingly, the period A for the first sewing operation is 1 hour 5 minutes zero seconds.

At S550, the total time period B during which the sewing operation pauses within the (C+1)-th sewing operation is calculated.

One situation where the sewing operation pauses is when a pause button (not shown) provided on the sewing machine 3 is operated. When the sewing operation of the sewing machine 3 pauses due to operation of the pause button, "PAUSE BUTTON HALT" is recorded in the log file. In this case, if a restart button (not shown) is operated, the sewing operation restarts. Upon operation of the restart button, "RESTART" is recorded in the log file. Therefore, by subtracting the time of "RESTART" from the time of "PAUSE BUTTON HALT", a period of time within which the sewing machine 3 pauses can be obtained.

Another situation where the sewing operation pauses is when a thread is broken. In such a case, "THREAD BROKEN HALT" is recorded in the log file together with information of the number of the head at which the thread is broken, and the like. When the problem is resolved, the restart button is operated and the sewing operation restarts. Then, "RESTART" is recorded in the log file. Accordingly, by subtracting the time of "THERAD BROKEN HALT" from the time of "RESTART", the period of time during which the sewing operation pauses can be obtained.

In the example shown in FIG. 11, during the first sewing operation, a first pause occurs at 10:10:50 of Feb. 11, 1997 due to "PAUSE BUTTON HALT", and ends at 10:14:34 of Feb. 11, 1997 due to "RESTART". The period of the first pause is 3 min. 44 sec. A second pauses occurs at 10:15:50 of Feb. 11, 1997 due to "THREAD BROKEN HALT", and ends at 10:17:34 of Feb. 11, 1997 due to "RESTART". The period of the second pause is 1 min. 44 sec. The total period B of the pause is therefore 5 min. 28 sec.

At S560, by subtracting period B from period A, actual operating period P excluding the pause period is obtained. In the above example, P=1 hr. 5 min. 0 sec.−5 min. 28 sec. =59 min. 32 sec.

At S570, the total operating time period TA, and the total sewing time period TS spent for the actual sewing operation is obtained. Specifically, the total operating time period TA is set to the sum of the time period TA and the above-obtained time period A, and the total sewing time period TS is set to the sum of the time period TS and the above-obtained time period P. In the above-described example, since the initial values of the time periods TA and TS are zero, TA=1 hr. 5 min. 0 sec., and TS=59 min. 32 sec.

Next, at S580, the counter C is incremented by one, and control returns to S530. At this stage, C=1 and N=4. Therefore, it is determined that C is less than N (S530:YES), and the procedure of S540 through S570 is repeated. Specifically, for the second sewing operation, the periods A, B and P are obtained, and the total operating time period TA and the total sewing time period TS are accumulated.

For the second sewing operation,

A=10:20:34−09:15:34=1 hr. 5 min. 0 sec.,

B=10:14:34−10:10:50+10:17:34−10:15:50 =3 min. 44 sec.+1 min. 44 sec. =5 min. 28 sec.

Accordingly,

P=1 hr. 5 min. 0 sec.−5 min. 28 sec. =59 min. 32 sec.

Therefore,

TA=1 hr. 5 min. 0 sec.+1 hr. 5 min. 0 sec. =2 hr. 10 min. 0 sec.

TS=59 min. 32 sec.+59 min. 32 sec. =1 hr. 59 min. 4 sec.

Then, at S580, the counter C is further incremented by one, and control returns to S530. At this stage, C=2 and N=4. Therefore, it is determined that C is less than N (S530:YES), and the procedure of S540 through S570 is repeated. Specifically, for the third sewing operation, the periods A, B and P are obtained, and the total operating time period TA and the total sewing time period TS are accumulated.

For the second sewing operation,

A=10:20:34−09:15:34=1 hr. 5 min. 0 sec.,

B=10:14:34−10:10:50+10:17:34−10:15:50 =3 min. 44 sec.+1 min. 44 sec. =5 min. 28 sec.

Accordingly,

P=1 hr. 5 min. 0 sec.−5 min. 28 sec. =59 min. 32 sec.

Therefore,

TA=2 hr. 10 min. 0 sec.+1 hr. 5 min. 0 sec. =3 hr. 15 min. 0 sec.

TS=1 hr. 59 min. 4 sec.+59 min. 32 sec. =2 hr. 58 min. 36 sec.

Then, at S580, the counter C is incremented by one, and control returns to S530. At this stage, C=3 and N=4. Therefore, it is still determined that C is less than N (S530:YES), and the procedure of S540 through S570 is repeated. Specifically, for the fourth sewing operation, the periods A, B and P are obtained, and the total operating time period TA and the total sewing time period TS are accumulated.

For the third sewing operation,

A=10:20:34−09:15:34=1 hr. 5 min. 0 sec.,

B=10:14:34−10:10:50+10:17:34−10:15:50 =3 min. 44 sec.+1 min. 44 sec. =5 min. 28 sec.

Accordingly,

P=1 hr. 5 min. 0 sec.−5 min. 28 sec. =59 min. 32 sec.

Therefore,

TA=3 hr. 15 min. 0 sec.+1 hr. 5 min. 0 sec. =4 hr. 20 min. 0 sec.

TS=2 hr. 58 min. 36 sec.+59 min. 32 sec. =3 hr. 58 min. 8 sec.

Then, at S580, the counter C is further incremented by one, and control returns to S530. At this stage, C=4 and N=4. Therefore, it is determined that C is not less than N (S530:NO), and control goes to S590 at which the rate of operation RO of the sewing machine 3 is calculated in accordance with an equation below.

$$RO = TS/TA \times 100.$$

In the example shown in FIG. 11,

RO=(3 hr. 58 min. 8 sec.)/(4 hr. 20 min. 0 sec.)×100 =91.6%.

Then the operation rate calculation procedure is terminated, and control goes to S340 of FIG. 10. At S340, the counter Cg is incremented by one. Then, control returns to S320 at which the counter Cg is compared with the number G of time zones. Since Cg=1 and G=2, it is determined that Cg is less than G (S320:YES), and the operation data creating procedures for (Cg+1)-th group are executed (S330). Specifically, the produced amount calculation procedure shown in FIG. 15 and the operation rate calculation procedure shown in FIG. 16 are executed based on the work data file shown in FIGS. 13 and 14.

For group B,

SUM=24, and RO=(3 hr. 58 min. 8 sec.)/(4 hr. 22 min. 0 sec.)×100 =90.9%.

Then, at S340, the counter Cg is incremented by one, and control returns to S320. Since, at this stage, Cg=2 and G =2, it is determined that Cg is not less than G (S320:NO), and therefore the operation data creating procedure shown in FIG. 10 is terminated.

With respect to the other sewing machines 5, 7, and 9, by executing the procedures described above, the produced amount SUM and the operation rate RO can be obtained for each group.

The values obtained in the above-described procedures are stored in a file for storing the operation data. At least a part of the operation data can be displayed on the CRT display 13. FIGS. 17 and 18 show exemplary screen images displaying the operation data.

In FIG. 17, the produced amount and the operation rate of group A with respect to the sewing machine 3 are displayed; and in FIG. 18, the produced amount and the operation rate of group B with respect to the sewing machine 3 are displayed.

As described above, according to the embodiment, even if a plurality of pattern sewing machines are used by a plurality of operator groups in shifts, operation data of individual operator group can be obtained. Therefore, a system administrator or the like may refer to the operation data including the produced amounts and operation rates, comparing the data among a plurality of groups, and make use of the data for production management.

It should be noted that the multi-head pattern sewing machine 3, 5, 7 and 9 may be embroidery sewing machines, pattern sewing machines such as a pattern setter for forming a predetermined fixed pattern, or the like.

In the embodiment, when the log files are divided into the work data files, a series of sewing operations is defined by "POWER ON" and "POWER OFF" of the sewing machine. It is possible that "START SEWING" and "END" are regarded as items defining the start and end of the series of the sewing operations.

In the embodiment, the log files are divided into the work data files based on the start of each sewing operation. It may be modified such that the log files are divided based on the end of each sewing operation.

In the examples described above, the operator groups start and end the sewing operations within the time zones corresponding to the operator groups, respectively. A sewing operation may not be completed within a time zone for one operator group if, for example, a sewing operation is started at a later time within the time zone, a complicated sewing pattern is to be sewn, or the like. In such a case, the sewing operation will be continued by another operator group.

Assume that group A starts a certain sewing operation at 13:00 which is not completed by 15:00, and that group B continues to perform the sewing operation which has not been completed by group A, and completes the same at 18:00. In this case, five hours (2 hours by the group A; and 3 hours by the group B) have been spent for producing a sheet of sewn product. In such a case, when the produced amount for each group is calculated, the total produced amount (e.g., one sheet of the sewn product) is divided proportionally to a period of time spent by each group for the sewn product. In the example above, a sheet of cloth is processed for 2 hours by group A, and for 3 hours by group B. Accordingly, the produced amount of the group A is $\tfrac{2}{5}$ sheets, and the produced amount of the group B is $\tfrac{3}{5}$ sheets.

In the above-described embodiment, as aforementioned, exemplary data in a log file shown in FIGS. 4 through 7 and exemplary data in work data files shown in FIGS. 11 through 14 are extremely simple. However, the data would be more complicated in practice and such data can also be processed.

In the above-described embodiment, the work data files are created based on the log files, and then the operation data is obtained with reference to the work data files. The embodiment can be modified to obtain the operation data based directly on the log files as shown in FIGS. 4 through 7, without creating the work data files.

In the above-described example, the operation data is created based on the log files for one week. However, the period is not limited to a week, but it could be a month, a day or the like. Further, yesterday's data could be processed.

The embodiment can be modified such that some or all of the procedures shown in FIGS. 3, 8, 10, 15 and 16 are executed by one or some of the pattern sewing machines 3, 5, 7 or 9.

The present disclosure relates to the subject matter contained in Japanese Patent Application No. HEI 09-70146, filed on Mar. 24, 1997, which is expressly incorporated herein by reference in its entirety.

What is claimed is:

1. A data processing device for processing data representing an operation status of a pattern sewing system, said pattern sewing system including at least one pattern sewing machine which is alternately operated by a plurality of operator groups, said data processing device comprising:

a time zone setting device, which sets a plurality of time zones, said plurality of operator groups operating said at least one pattern sewing machine during said plurality of time zones, respectively;

an operation status detecting device, which detects an operation status of said at least one pattern sewing machine;

a log data recording device, which records said operation status of said at least one pattern sewing machine detected by said operation status detecting device as log data; and an operation data creating device, which creates operation data representing a predetermined operation parameter for each of said plurality of operator groups based on said plurality of time zones set by said time zone setting device and said log data recorded by said log data recording device.

2. The data processing device according to claim 1, wherein said operation data creating device comprises a work data creating device, said work data creating device creating a plurality of work files by extracting data corresponding to said plurality of time zones from said log data, respectively, said operation data being generated based on said plurality of work files.

3. The data processing device according to claim 2, wherein said operation data creating device creates said operation data based on said log data obtained within a predetermined period.

4. The data processing device according to claim 3, wherein said predetermined period is one of a month, a week, and a day.

5. The data processing device according to claim 2, further comprising a period setting device which sets a period of time, and wherein said operation data creating device creates said operation data based on said log data obtained within said period set by said period setting device.

6. The data processing device according to claim 5, wherein said period setting device sets said period by selecting one of a plurality of predetermined periods.

7. The data processing device according to claim 1, wherein said operation data creating device extracts a predetermined series of operations corresponding to each of said plurality of time zones and creates said operation data for each of said plurality of operator groups.

8. The data processing device according to claim 7, wherein said predetermined series of operations starts when a sewing operation of said at least one pattern sewing machine is started and ends when said sewing operation of said at least one sewing machine is terminated.

9. The data processing device according to claim 8, wherein said operation data creating device creates said operation data for said plurality of operator groups if said series of operations starts within one of said plurality of time zones.

10. The data processing device according to claim 8, wherein said operation data creating device creates said operation data for said plurality of operator groups if said series of operations ends within one of said plurality of time zones.

11. The data processing device according to claim 8, wherein, if said predetermined series of operations is executed over more than one time zone, said operation data creating device creates said operation data for operator groups, which corresponds to said more than one time zone, in proportion to periods of time spent by said operator groups, respectively.

12. The data processing device according to claim 1, wherein said predetermined operation parameter comprises a produced amount of said at least one of said pattern sewing machine.

13. The data processing device according to claim 1, wherein said predetermined operation parameter comprises a rate of operation of said at least one of said pattern sewing machine.

14. A data processing device for processing data representing an operation status of a pattern sewing system, said pattern sewing system including at least one pattern sewing machine, a series of operations defining a sewing operation, a plurality of sewing operations being executed by said at least one pattern sewing machine, said data processing device comprising:

a log data recording device, which records an operation status of said at least one pattern sewing machine as log data;

a controller which categorizes said plurality of sewing operations into a plurality of operation groups based on a time zone in which each of said plurality of sewing operations is executed; and an operation data creating device, which creates operation data representing a predetermined operation parameter corresponding to each of said operation groups based on said log data.

15. A data processing device for processing data representing an operation status of a pattern sewing system, said pattern sewing system including at least one pattern sewing machine which is alternately operated by a plurality of operator groups, said data processing device comprising:

time zone setting means for setting a plurality of time zones, said plurality of operator groups operating said at least one pattern sewing machine during said plurality of time zones, respectively;

operation status detecting means for detecting an operation status of said at least one pattern sewing machine;

log data recording means for recording said operation status of said at least one pattern sewing machine detected by said operation status detecting means as log data; and operation data creating means for creating operation data representing a predetermined operation parameter for each of said plurality of operator groups based on said plurality of time zones set by said time zone setting means and said log data recorded by said log data recording means.

16. The data processing device according to claim 15, wherein said operation data creating means comprises a work data creating means for creating a plurality of work files by extracting data corresponding to said plurality of time zones from said log data, respectively, said operation data being generated based on said plurality of work files.

17. A memory medium storing a program executed by a data processing device for processing data representing an operation status of a pattern sewing system, said pattern sewing system including at least one pattern sewing machine which is alternately operated by a plurality of operator groups, said program comprising steps of:

repeatedly executing steps of:
        (1) detecting an operation status of said at least one pattern sewing machine, and
        (2) recording said operation status of said at least one pattern sewing machine as log data;

setting a plurality of time zones, said plurality of operator groups operating said at least one pattern sewing machine during said plurality of time zones, respectively; and creating operation data representing a predetermined operation parameter for each of said plurality of operator groups based on said plurality of time zones and said log data.

18. The memory medium according to claim 17, wherein said step of creating said operation data includes a step of creating a plurality of work files by extracting data corresponding to said plurality of time zones from said log data, respectively, said operation data being generated based on said plurality of work files.

19. The memory medium according to claim 18, wherein said step of creating said operation data further includes a step of creating said operation data based on said log data which is obtained within a predetermined period.

20. A data processing device for processing data representing an operation status of a pattern sewing system, said pattern sewing system including at least one pattern sewing machine which is alternately operated by a plurality of operator groups, said data processing device comprising:

an operation status detecting device, which detects an operation status of said at least one pattern sewing machine;

a log data recording device, which records said operation status of said at least one pattern sewing machine detected by said operation status detecting device as log data, said log data recording device recording identifying data which can be used for identifying each of said plurality of operator groups together with said operation status; and an operation data creating device, which creates a plurality of sets of operation data by dividing said operation status log data in accordance with said identifying data, said plurality of sets of operation data representing a predetermined operation parameter for said plurality of operator groups, respectively.

\* \* \* \* \*